US012634625B2

(12) United States Patent
Lee et al.

(10) Patent No.: US 12,634,625 B2
(45) Date of Patent: May 19, 2026

(54) VIBRATION-DAMPING RECTANGULAR MAGNETIC ASSEMBLY

(71) Applicant: FORTUNE GRAND TECHNOLOGY INC., Taoyuan City (TW)

(72) Inventors: Ping-Yu Lee, Taoyuan City (TW); De-Wu Wang, Taoyuan City (TW); Zhi-Long Niu, Taoyuan City (TW)

(73) Assignee: FORTUNE GRAND TECHNOLOGY INC., Taoyuan City (TW)

( * ) Notice: Subject to any disclaimer, the term of this patent is extended or adjusted under 35 U.S.C. 154(b) by 151 days.

(21) Appl. No.: 18/784,966

(22) Filed: Jul. 26, 2024

(65) Prior Publication Data

US 2025/0056153 A1 Feb. 13, 2025

(30) Foreign Application Priority Data

Aug. 11, 2023 (CN) ......................... 202311013566.3

(51) Int. Cl.
*H04R 1/28* (2006.01)
*H04R 9/02* (2006.01)
*H04R 9/06* (2006.01)

(52) U.S. Cl.
CPC ........... *H04R 1/2873* (2013.01); *H04R 9/025* (2013.01); *H04R 9/06* (2013.01)

(58) Field of Classification Search
CPC ......... H04R 1/2873; H04R 9/025; H04R 9/06
See application file for complete search history.

(56) References Cited

U.S. PATENT DOCUMENTS

2024/0022853 A1* 1/2024 Tong ........................ H04R 9/06

FOREIGN PATENT DOCUMENTS

CN 107801135 A * 3/2018 ............... H04R 9/06

OTHER PUBLICATIONS

Machine translation of CN 107801135A; Mar. 13, 2018 (Year: 2018).*

* cited by examiner

*Primary Examiner* — Andrew Sniezek

(57) ABSTRACT

A vibration-damping rectangular magnetic assembly includes a rectangular magnetic assembly and a vibration-damping structure. The rectangular magnetic assembly includes a main magnetic plate, magnetic unit, vibration-damping structure connecting portion and vibration-damping groove. The magnetic unit is disposed at the top of the main magnetic plate. The vibration-damping structure connecting portion and the vibration-damping groove are disposed at the bottom of the main magnetic plate, with the vibration-damping groove disposed outside the vibration-damping structure connecting portion. The vibration-damping structure includes a ring-shaped speaker base butting portion, magnetic assembly butting portion disposed inside the ring-shaped speaker base butting portion, first and second resilient connecting modules connected between the ring-shaped speaker base butting portion and the magnetic assembly butting portion. The magnetic assembly butting portion is connected to the vibration-damping structure connecting portion. The first and second resilient connecting modules are disposed at the vibration-damping groove.

14 Claims, 8 Drawing Sheets

1

VIBRATION-DAMPING RECTANGULAR MAGNETIC ASSEMBLY

CROSS-REFERENCE TO RELATED APPLICATION

This non-provisional application claims priority under 35 U.S.C. § 119 (a) on Patent Application No(s). 202311013566.3 filed in China on Aug. 11, 2023, the entire contents of which are hereby incorporated by reference.

BACKGROUND OF THE INVENTION

1. Field of the Invention

The present disclosure relates to a vibration-damping rectangular magnetic assembly, and in particular to a vibration-damping rectangular magnetic assembly fitted to a sound-generating unit to achieve vibration damping and vibration isolation in operation.

2. Description of the Related Art

A conventional loudspeaker typically has a magnetic assembly fixedly fitted to a speaker base of the loudspeaker. There is not any design of a buffer between the speaker base and the magnetic assembly. As a result, the vibration of the loudspeaker in operation is directly transmitted to a casing of an electronic device on which the loudspeaker is mounted, causing discomfort to persons using the electronic device.

Therefore, it is imperative to provide a vibration-damping rectangular magnetic assembly that achieves vibration damping and vibration isolation in operation to spare users the discomfort they will otherwise experience for using electronic devices.

BRIEF SUMMARY OF THE INVENTION

In view of the aforesaid drawbacks of the prior art, it is an objective of the disclosure to provide a vibration-damping rectangular magnetic assembly fitted to a sound-generating unit to form a loudspeaker, with a vibration-damping structure functioning as a buffer between the sound-generating unit and the rectangular magnetic assembly to achieve vibration damping and vibration isolation in operation to spare users the discomfort they will otherwise experience for using electronic devices.

To achieve the above and other objectives, the disclosure provides a vibration-damping rectangular magnetic assembly comprising a rectangular magnetic assembly and a vibration-damping structure. The rectangular magnetic assembly includes a main magnetic plate, a magnetic unit, a vibration-damping structure connecting portion and at least one vibration-damping groove. The magnetic unit is disposed at the top of the main magnetic plate. The vibration-damping structure connecting portion and the vibration-damping groove are disposed at the bottom of the main magnetic plate. The vibration-damping groove is disposed outside the vibration-damping structure connecting portion. The vibration-damping structure includes a ring-shaped speaker base butting portion, a magnetic assembly butting portion, a first resilient connecting module and a second resilient connecting module. The magnetic assembly butting portion is disposed inside the ring-shaped speaker base butting portion. The first resilient connecting module and the second resilient connecting module are connected between two long sides and two short sides of the ring-shaped speaker base butting portion and between two long sides and two short sides of the magnetic assembly butting portion. The magnetic assembly butting portion is connected to the vibration-damping structure connecting portion. The first resilient connecting module and the second resilient connecting module are disposed at the vibration-damping groove.

In the vibration-damping rectangular magnetic assembly, the vibration-damping groove are in the number of two, the vibration-damping grooves are disposed on two short sides of the main magnetic plate respectively, the first resilient connecting module is disposed at one of the vibration-damping grooves, and the second resilient connecting module is disposed at the other vibration-damping groove.

In the vibration-damping rectangular magnetic assembly, the vibration-damping grooves are U-shaped each, and a portion of each of the vibration-damping grooves extends to the two long sides of the main magnetic plate.

In the vibration-damping rectangular magnetic assembly, the vibration-damping grooves are in the number of one, with the vibration-damping groove being ring-shaped and surrounding the vibration-damping structure connecting portion from outside, wherein the first resilient connecting module and the second resilient connecting module are disposed at the vibration-damping groove, with the first resilient connecting module disposed on a short side of the main magnetic plate and two long sides of the main magnetic plate, with the second resilient connecting module disposed on another short side of the main magnetic plate and the long sides of the main magnetic plate.

In the vibration-damping rectangular magnetic assembly, the ring-shaped speaker base butting portion includes a plurality of fitting portions coupled to a speaker base.

In the vibration-damping rectangular magnetic assembly, the first resilient connecting module includes at least one first short-side resilient arm, and the second resilient connecting module includes at least one second short-side resilient arm, the first and second short-side resilient arms being symmetrical to each other, or the first resilient connecting module includes at least one first long-side resilient arm, and the second resilient connecting module includes at least one second long-side resilient arm, the first and second long-side resilient arms being symmetrical to each other.

In the vibration-damping rectangular magnetic assembly, the first long-side resilient arms are in the number of two, the second long-side resilient arms are in the number of two, the first long-side resilient arms are adjacent to a short side of the magnetic assembly butting portion, and the second long-side resilient arms are adjacent to another short side of the magnetic assembly butting portion.

In the vibration-damping rectangular magnetic assembly, the first long-side resilient arms are in the number of two, the second long-side resilient arms are in the number of two, the first long-side resilient arms and the second long-side resilient arms are adjacent to the middle of the magnetic assembly butting portion.

In the vibration-damping rectangular magnetic assembly, the first short-side resilient arm is connected between a short side of the ring-shaped speaker base butting portion and a short side of the magnetic assembly butting portion, and the second short-side resilient arm is connected between another short side of the ring-shaped speaker base butting portion and another short side of the magnetic assembly butting portion.

In the vibration-damping rectangular magnetic assembly, the first long-side resilient arm is connected between a long side of the ring-shaped frame portion and a long side of the magnetic butting portion, and the second long-side resilient arm is connected between another long side of the ring-shaped frame portion and another long side of the magnetic butting portion.

In the vibration-damping rectangular magnetic assembly, the first short-side resilient arm are in the number of two, the second short-side resilient arm are in the number of two, each of the first short-side resilient arms is U-shaped and has a first short-side bend portion, the first short-side bend portions facing opposite directions, each of the second short-side resilient arms is U-shaped and has a second short-side bend portion, the second short-side bend portions facing opposite directions.

In the vibration-damping rectangular magnetic assembly, the first long-side resilient arms are in the number of two, the second long-side resilient arms are in the number of two, each of the first long-side resilient arms is U-shaped and has a first long-side bend portion, the first long-side bend portions facing the same direction, each of the second long-side resilient arms is U-shaped and has a second long-side bend portion, the second long-side bend portions facing the same direction.

In the vibration-damping rectangular magnetic assembly, each of the first long-side resilient arms is U-shaped and has a first long-side bend portion, a first side and a second side of each of the first long-side bend portions are parallel to a long side of the ring-shaped speaker base butting portion and a long side of the magnetic assembly butting portion respectively and are in a length ratio of from 1.6:1 to 2.4:1, each of the second long-side resilient arms is U-shaped and has a second long-side bend portion, a first side and a second side of each of the second long-side bend portions are parallel to the long side of the ring-shaped speaker base butting portion and the long side of the magnetic assembly butting portion respectively and are in a length ratio of from 1.6:1 to 2.4:1.

The vibration-damping rectangular magnetic assembly further comprises a plurality of damping units disposed between the ring-shaped speaker base butting portion and the main magnetic plate or between a fitting portion of the ring-shaped speaker base butting portion and a butting portion of a speaker base, the damping units being symmetrical to each other.

Therefore, the disclosure provides a vibration-damping rectangular magnetic assembly fitted to a sound-generating unit to form a loudspeaker, with a vibration-damping structure functioning as a buffer between the sound-generating unit and the rectangular magnetic assembly to achieve vibration damping and vibration isolation in operation to spare users the discomfort they will otherwise experience for using electronic devices.

DETAILED DESCRIPTION OF THE INVENTION

Figure 1:
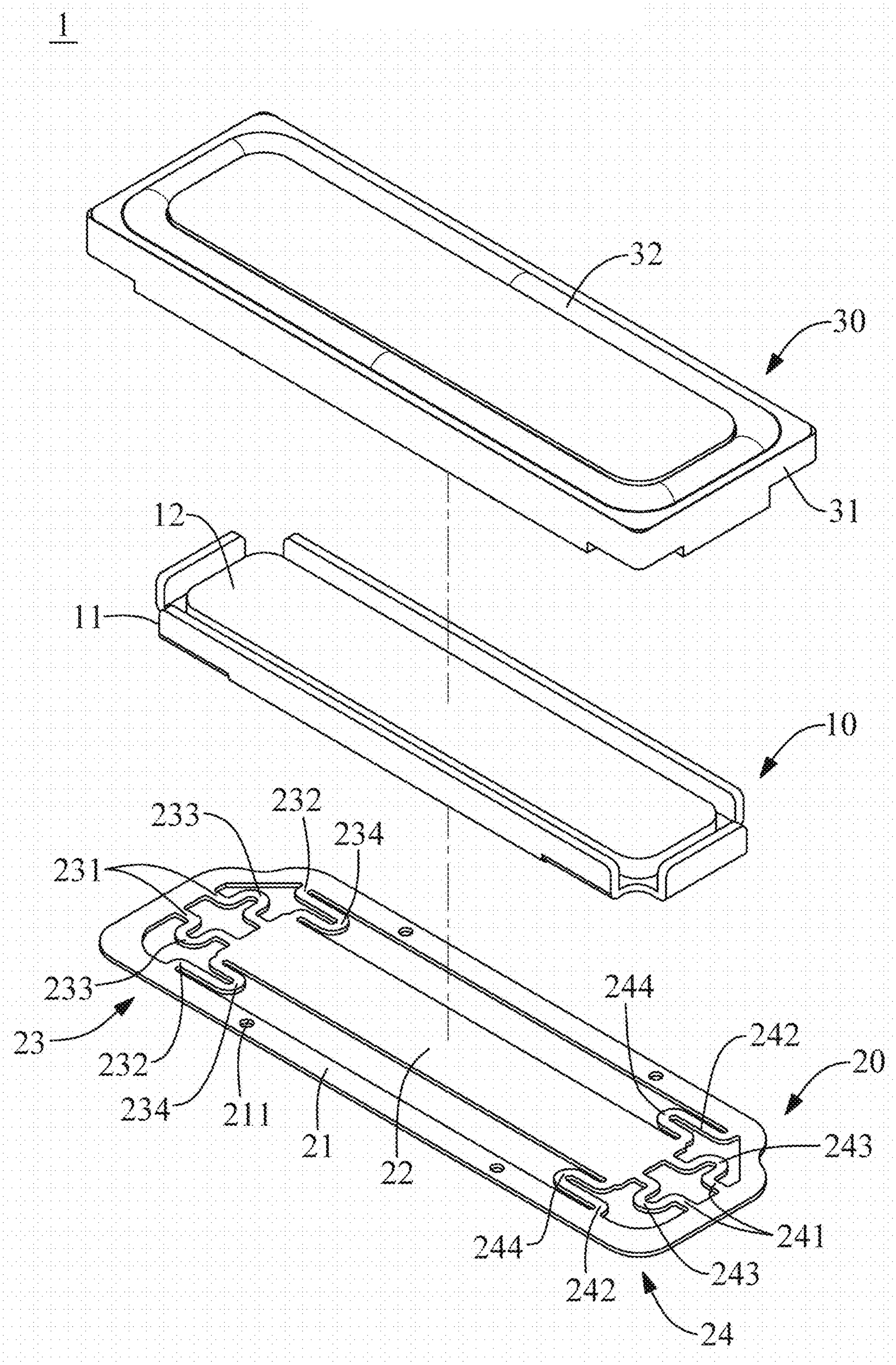
FIG. 1 is the first exploded view of a vibration-damping rectangular magnetic assembly according to the first embodiment of the disclosure.
Figure 2:
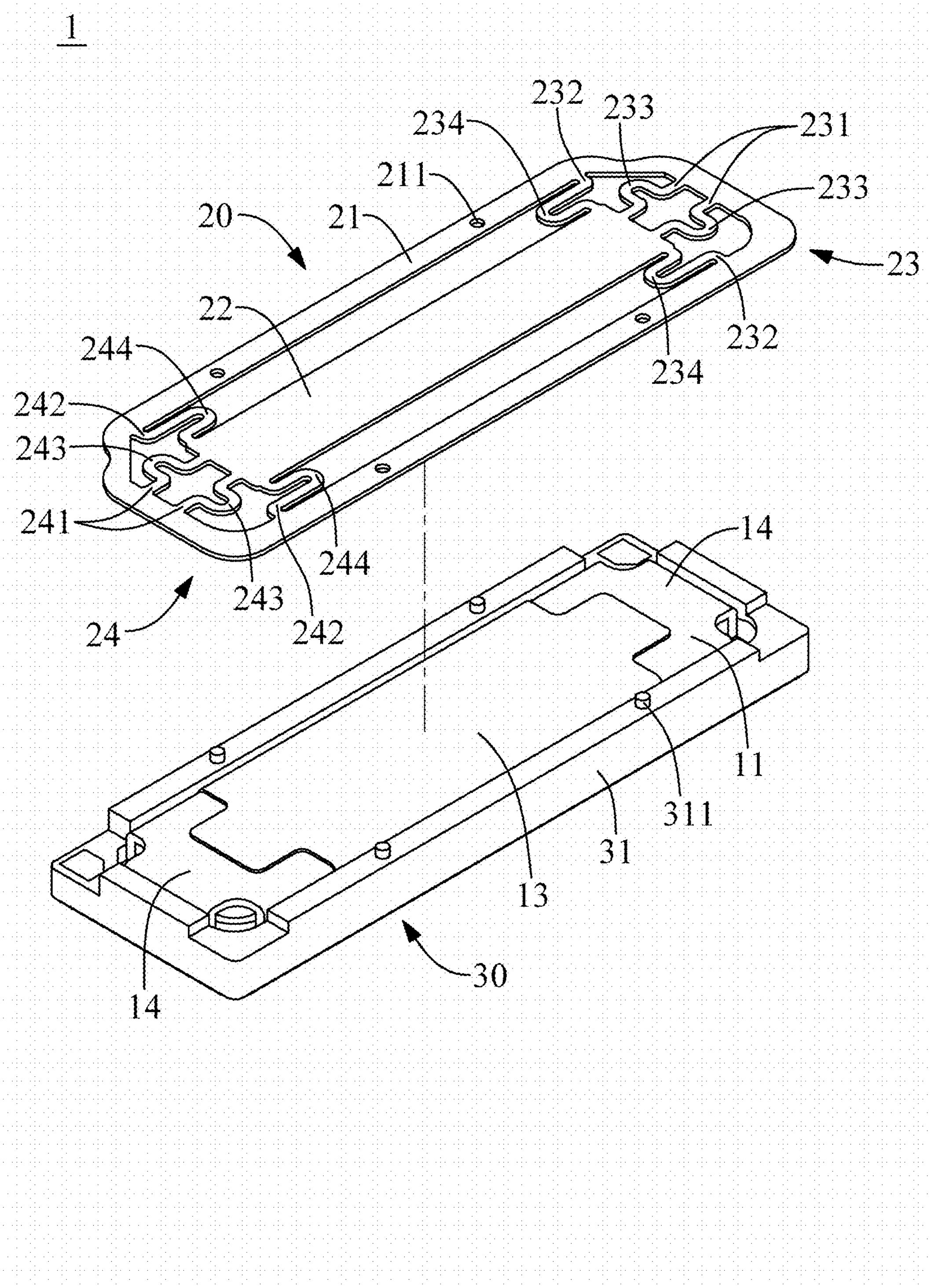
FIG. 2 is the second exploded view of the vibration-damping rectangular magnetic assembly according to the first embodiment of the disclosure.
Figure 3:
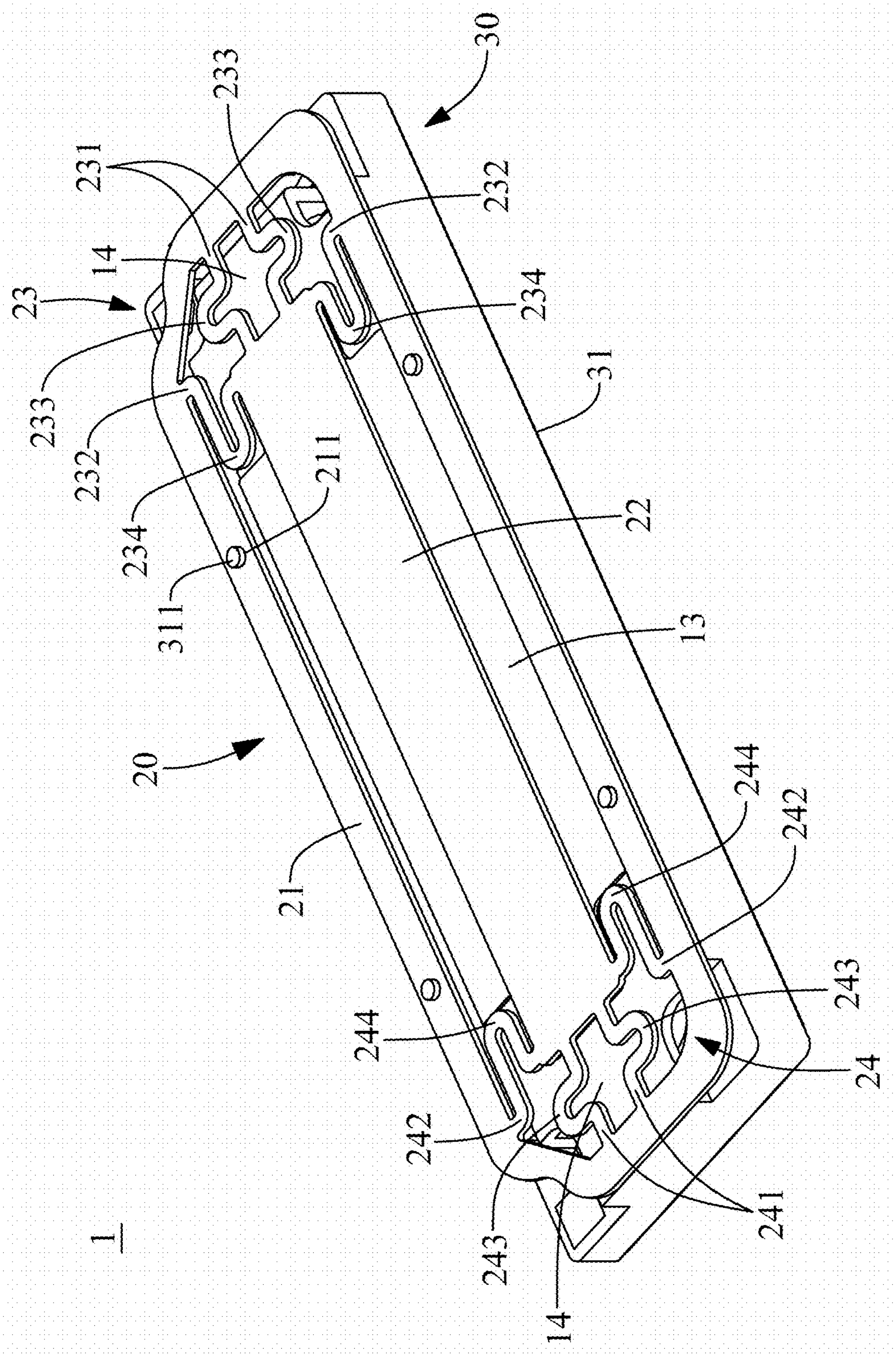
FIG. 3 is the first schematic view of the bottom of the vibration-damping rectangular magnetic assembly according to the first embodiment of the disclosure.

To facilitate understanding of the object, characteristics and effects of this present disclosure, embodiments together with the attached drawings for the detailed description of the present disclosure are provided.

Referring to the first embodiment illustrated by FIG. 1 through FIG. 4 and the second embodiment illustrated by FIG. 5 through FIG. 8, as shown in the diagrams, the disclosure provides a vibration-damping rectangular magnetic assembly comprising a rectangular magnetic assembly 10 and a vibration-damping structure 20. The rectangular magnetic assembly 10 may also be a square magnetic assembly with long sides equal to short sides in length. The vibration-damping structure 20 corresponds in shape to the rectangular magnetic assembly 10 and thus may be rectangular, substantially rectangular, square or substantially square in shape.

The rectangular magnetic assembly 10 includes a main magnetic plate 11, a magnetic unit 12, a vibration-damping structure connecting portion 13 and at least one vibration-damping groove 14. The magnetic units 12 is disposed at the top of the main magnetic plate 11. The vibration-damping structure connecting portion 13 and the vibration-damping groove 14 are disposed at the bottom of the main magnetic plate 11. The vibration-damping structure connecting portion 13 and the vibration-damping groove 14 are integrally formed at the bottom of the main magnetic plate 11. The vibration-damping groove 14 is disposed outside the vibration-damping structure connecting portion 13. The vibration-damping structure connecting portion 13 protrudes from the bottom of the main magnetic plate 11 relative to the vibration-damping groove 14.

The vibration-damping structure 20 is integrally formed and includes a ring-shaped speaker base butting portion 21, a magnetic assembly butting portion 22, a first resilient connecting module 23 and a second resilient connecting module 24. The magnetic assembly butting portion 22 is disposed inside the ring-shaped speaker base butting portion 21. The first resilient connecting module 23 and the second resilient connecting module 24 are connected between the two long sides and two short sides of the ring-shaped speaker base butting portion 21 as well as between the two long sides and two short sides of the magnetic assembly butting portion 22. The magnetic assembly butting portion 22 is connected to the vibration-damping structure connecting portion 13. The magnetic assembly butting portion 22 is adhered or welded to the vibration-damping structure connecting portion 13. The first resilient connecting module 23 and the second resilient connecting module 24 are disposed at the vibration-damping groove 14. In the disclosure, the vibration-damping structure 20 is made of stainless steel.

To start the operation of the vibration-damping rectangular magnetic assembly of the disclosure, the ring-shaped speaker base butting portion 21 of the vibration-damping structure 20 and a speaker base 31 of a sound-generating unit 30 are combined to form a loudspeaker 1, and the ring-shaped speaker base butting portion 21 has a plurality of fitting portions 211 (for example, fitting holes) coupled to a butting portion 311 (for example, a butting bump) of the speaker base 31 and then adhered thereto to preclude any deviation between the sound-generating unit 30 and the rectangular magnetic assembly 10, allowing the sound-generating unit 30 and the rectangular magnetic assembly 10 to be coupled together quickly and easily to enhance production yield. During its operation, the loudspeaker 1 can be coupled to an acoustic enclosure (not shown) to allow the voice coil of the sound-generating unit 30 to receive external electronic signals such that the main magnetic plate 11 and magnetic units 12 of the rectangular magnetic assembly 10 coordinate with each other to provide more magnetic energy to allow the voice coil to coordinate with the electromagnetic effect of the rectangular magnetic assembly 10 to drive the diaphragm 32 vibrating, causing the loudspeaker 1 to generate sounds.

During the aforesaid operation of the loudspeaker 1, owing to the rectangular magnetic assembly 10 and the vibration-damping structure 20, the speaker base 31 of the sound-generating unit 30 is not in direct contact with the rectangular magnetic assembly 10, and thus the vibration-damping structure 20 can function as a buffer between the speaker base 31 and the rectangular magnetic assembly 10; as a result, the vibration of the rectangular magnetic assembly 10 and the vibration of the speaker base 31 are equal in frequency substantially but opposite in phase to further achieve vibration damping and thereby spare users the discomfort they will otherwise experience for using electronic devices.

Referring to the first embodiment illustrated by FIG. 1 through FIG. 4, as shown in the diagrams, the vibration-damping grooves 14 are in the number of two and are disposed on two short sides of the main magnetic plate 11 respectively, with the first resilient connecting module 23 disposed at one of the vibration-damping grooves 14, with the second resilient connecting module 24 disposed at the other vibration-damping groove 14. The vibration-damping grooves 14 are U-shaped each, and a portion of each of the vibration-damping grooves 14 extends to the two long sides of the main magnetic plate 11. Thus, the vibration-damping structure 20 is symmetrically disposed on the two short sides of the rectangular magnetic assembly 10 such that the vibration-damping structure 20 functions as a buffer between the speaker base 31 and the rectangular magnetic assembly 10 to absorb (consume) the kinetic energy generated from the vibration of the speaker base 31 and prevent the kinetic energy generated from the vibration of the rectangular magnetic assembly 10 from returning, so as to achieve vibration damping and vibration isolation during the operation of the loudspeaker 1 to spare users the discomfort they will otherwise experience for using electronic devices.

Referring to the second embodiment illustrated by FIG. 5 through FIG. 8, as shown in the diagrams, the vibration-damping groove 14 is in the number of one, is ring-shaped, and surrounds the vibration-damping structure connecting portion 13 from outside. The first resilient connecting module 23 and the second resilient connecting module 24 are disposed at the vibration-damping groove 14. The first resilient connecting module 23 is disposed on a short side of the main magnetic plate 11 and two long sides of the main magnetic plate 11. The second resilient connecting module 24 is disposed on another short side of the main magnetic plate 11 and the long sides of the main magnetic plate 11. Therefore, the vibration-damping structure 20 is symmetrically disposed on the two short sides and two long sides of the rectangular magnetic assembly 10 such that the vibration-damping structure 20 functions as a buffer between the speaker base 31 and the rectangular magnetic assembly 10 to absorb (consume) the kinetic energy generated from the vibration of the speaker base 31 and prevent the kinetic energy generated from the vibration of the rectangular magnetic assembly 10 from returning, so as to achieve vibration damping and vibration isolation during the operation of the loudspeaker 1 to spare users the discomfort they will otherwise experience for using electronic devices.

In addition to the first embodiment illustrated by FIG. 1 through FIG. 4 and the second embodiment illustrated by FIG. 5 through FIG. 8, as shown in the diagrams, the disclosure provides yet another embodiment in which the first resilient connecting module 23 includes at least one first short-side resilient arm 231 (for example, two first short-side resilient arms 231 in this embodiment), and the second resilient connecting module 24 includes at least one second short-side resilient arm 241 (for example, two second short-side resilient arms 241 in this embodiment). The first short-side resilient arm 231 and the second short-side resilient arm 241 are symmetrical to each other. The first short-side resilient arms 231 are connected between a short side of the ring-shaped speaker base butting portion 21 and a short side of the magnetic assembly butting portion 22. The second short-side resilient arms 241 are connected between another short side of the ring-shaped speaker base butting portion 21 and another short side of the magnetic assembly butting portion 22. Alternatively, the first resilient connecting module 23 includes at least one first long-side resilient arms 232 (for example, two first long-side resilient arms 232 in this embodiment). The second resilient connecting module 24 further includes at least one second long-side resilient arms 242 (for example, two second long-side resilient arms 242 in this embodiment). The first long-side resilient arms 232 and the second long-side resilient arms 242 are symmetrical to each other. The first long-side resilient arms 232 are connected between a long side of the ring-shaped speaker base butting portion 21 and a long side of the magnetic assembly butting portion 22. The second long-side resilient arms 242 are connected between another long side of the ring-shaped speaker base butting portion 21 and another long side of the magnetic assembly butting portion 22. Referring to the first embodiment illustrated by FIG. 1 through FIG. 4, as shown in the diagrams, the first long-side resilient arms 232 are in the number of two, and the second long-side resilient arms 242 are in the number of two, with the first long-side resilient arms 232 being adjacent to a short side of the magnetic assembly butting portion 22, with the second long-side resilient arms 242 being adjacent to a short side of the magnetic assembly butting portion 22. The first short-side resilient arms 231 and the first long-side resilient arms 232 of the first resilient connecting module 23 are disposed at one of the vibration-damping grooves 14. The second short-side resilient arms 241 and the second long-side resilient arms 242 of the second resilient connecting module 24 are disposed at the other vibration-damping groove 14. Referring to the second embodiment illustrated by FIG. 5 through FIG. 8, as shown in the diagrams, the first long-side resilient arms 232 are in the number of two, and the second long-side resilient arms 242 are in the number of two. The first long-side resilient arms 232 and the second long-side resilient arms 242 are adjacent to the middle of the magnetic assembly butting portion 22, allowing the first short-side resilient arms 231 and the first long-side resilient arms 232 of the first resilient connecting module 23 as well as the second short-side resilient arms 241 and the second long-side resilient arms 242 of the second resilient connecting module 24 to be evenly distributed in the vibration-damping grooves 14.

Therefore, the first short-side resilient arms 231, the first long-side resilient arms 232, the second short-side resilient arms 241 and the second long-side resilient arms 242 of the vibration-damping structure 20 are symmetrically disposed on the long sides and the short sides of the rectangular magnetic assembly 10 such that the first short-side resilient arms 231, the first long-side resilient arms 232, the second short-side resilient arms 241 and the second long-side resilient arms 242 provide support from X-axis direction and Y-axis direction to buffer the vibration of the rectangular magnetic assembly 10, allow the vibration-damping structure 20 to function as a buffer between the speaker base 31 and the rectangular magnetic assembly 10, and allow the vibration of the rectangular magnetic assembly 10 and the vibration of the speaker base 31 to be equal in frequency substantially but opposite in phase to further achieve vibration damping and thereby spare users the discomfort they will otherwise experience for using electronic devices.

Figure 4:
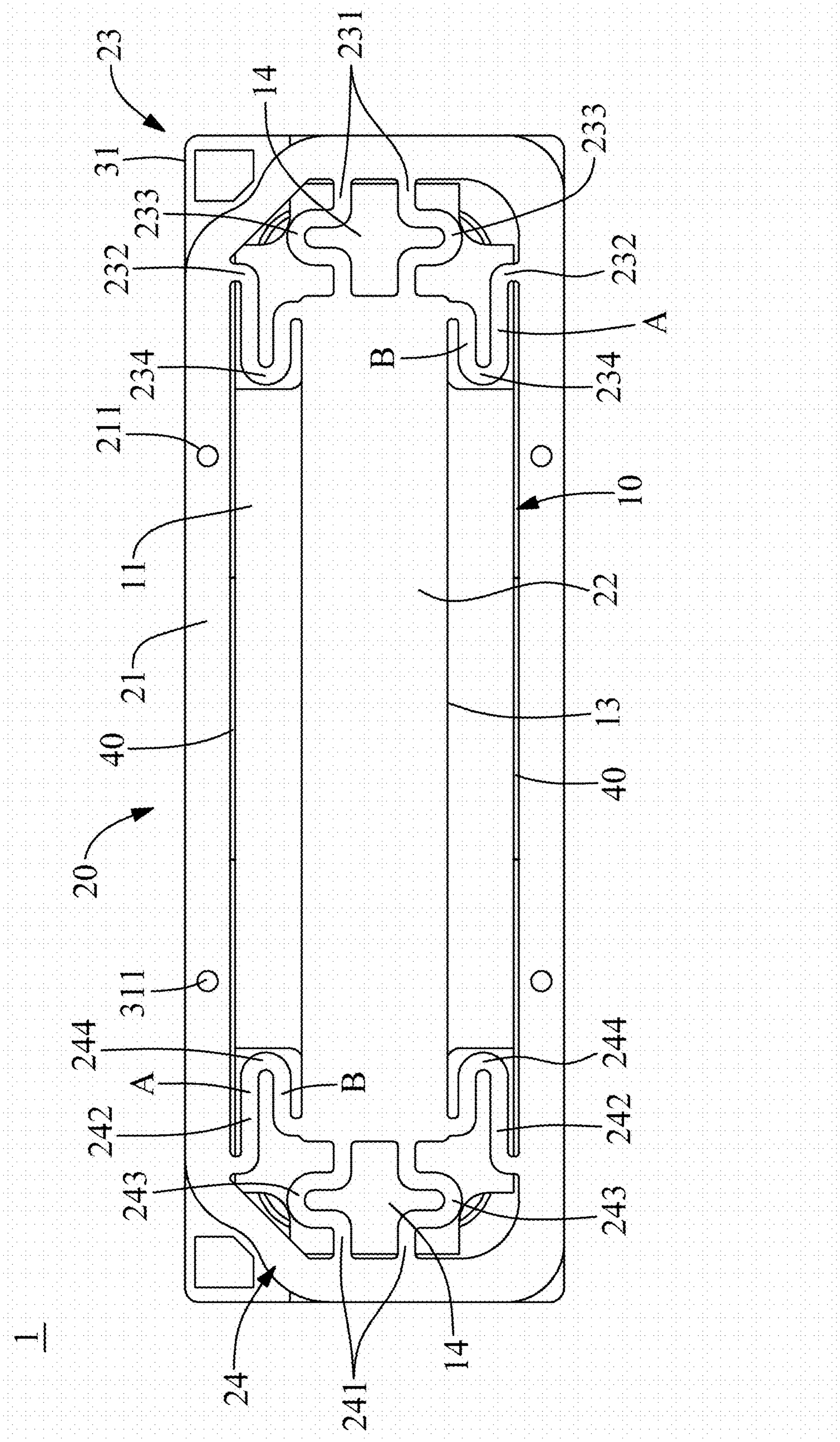
FIG. 4 is the second schematic view of the bottom of the vibration-damping rectangular magnetic assembly according to the first embodiment of the disclosure.
Figure 5:
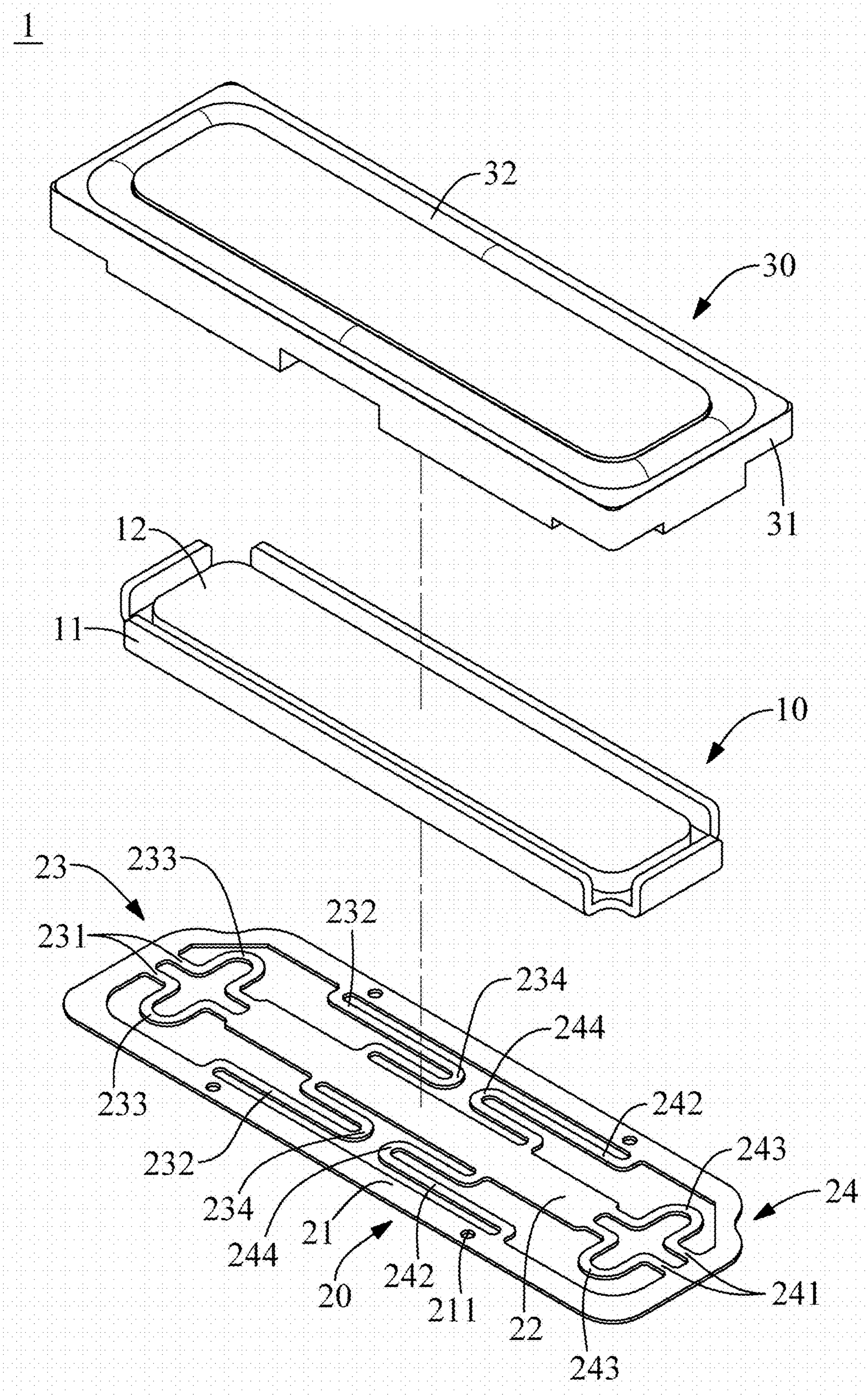
FIG. 5 is the first exploded view of the vibration-damping rectangular magnetic assembly according to the second embodiment of the disclosure.
Figure 6:
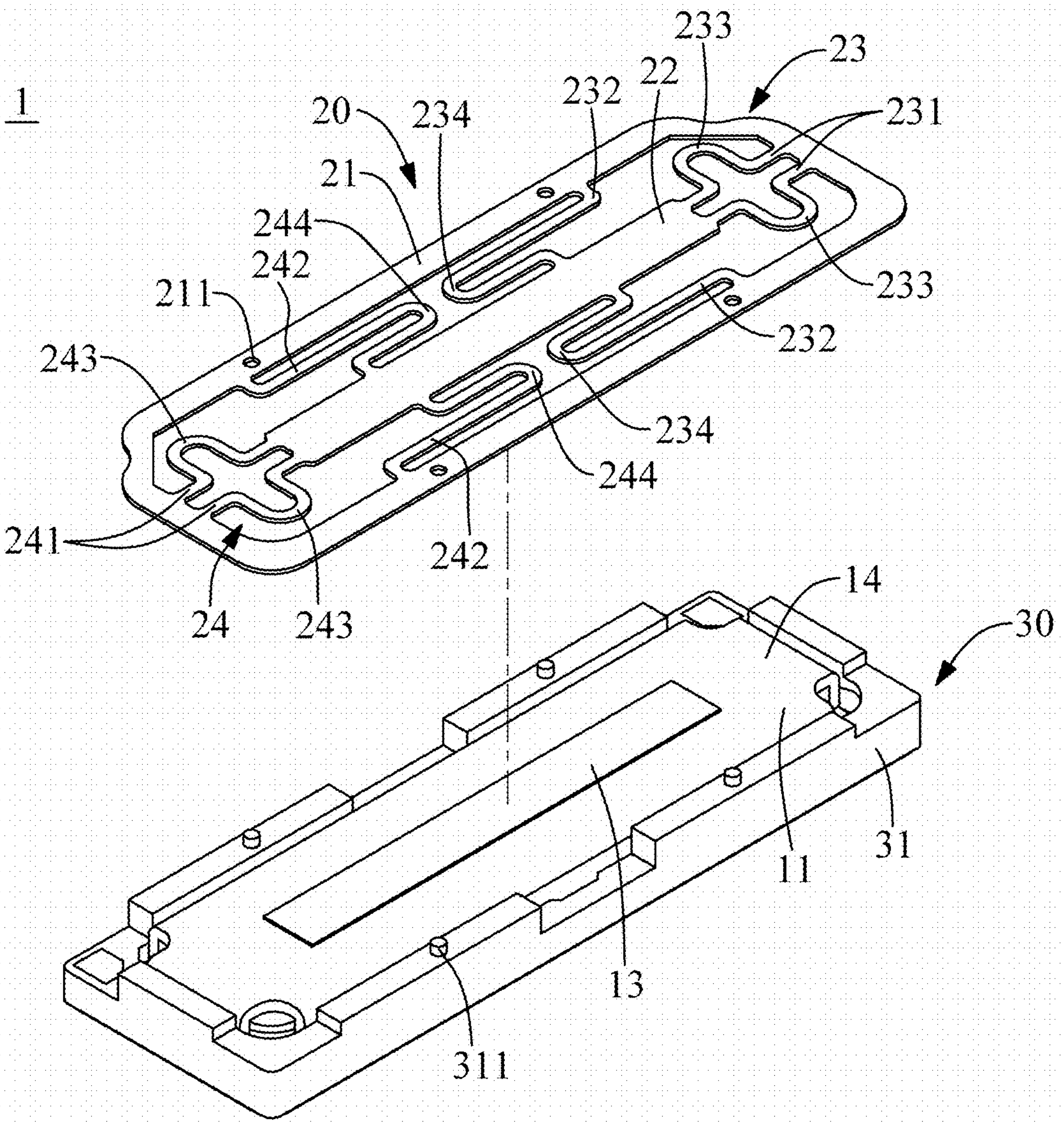
FIG. 6 is the second exploded view of the vibration-damping rectangular magnetic assembly according to the second embodiment of the disclosure.
Figure 7:
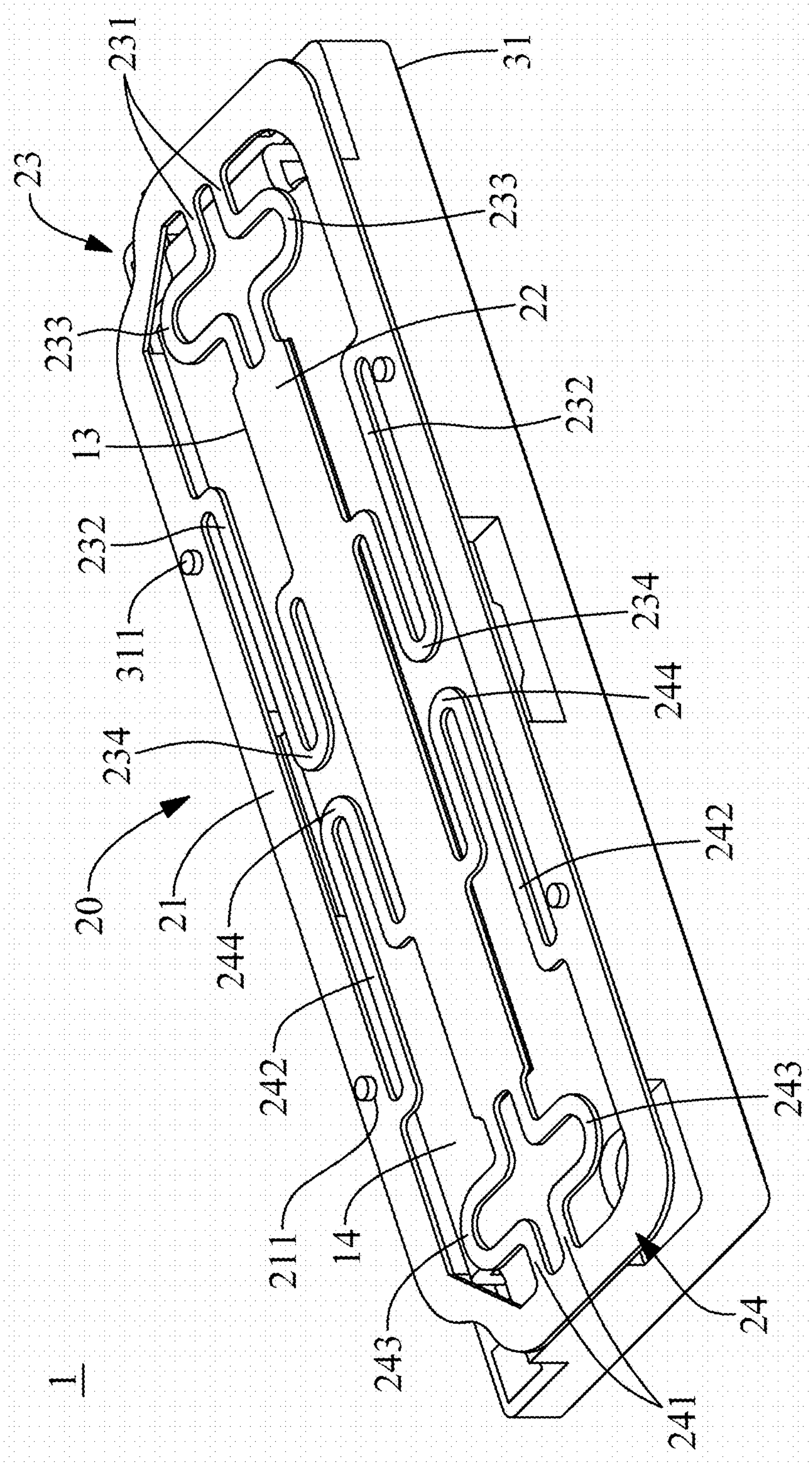
FIG. 7 is the first schematic view of the bottom of the vibration-damping rectangular magnetic assembly according to the second embodiment of the disclosure.
Figure 8:
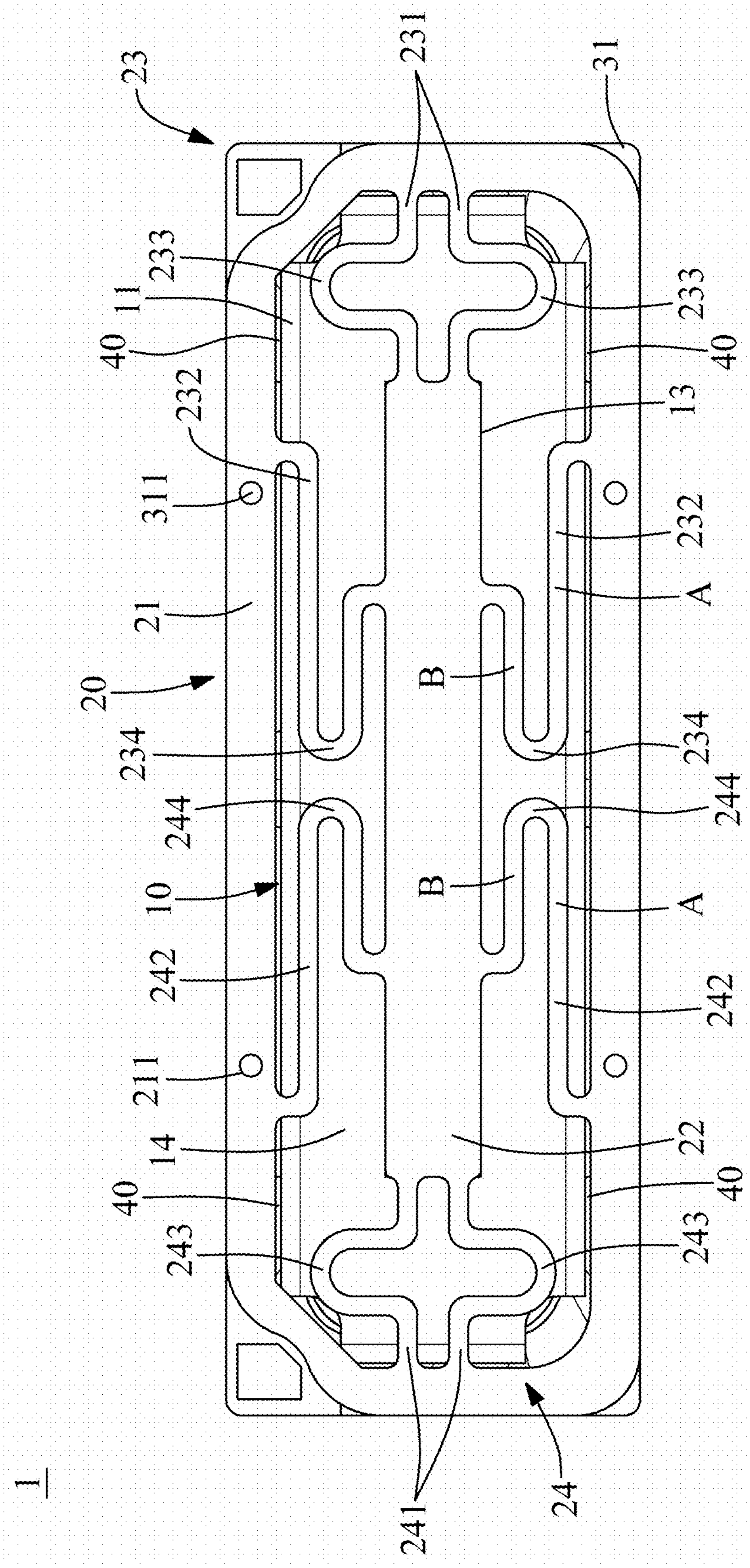
FIG. 8 is the second schematic view of the bottom of the vibration-damping rectangular magnetic assembly according to the second embodiment of the disclosure.

In addition to the first embodiment illustrated by FIG. 1 through FIG. 4 and the second embodiment illustrated by FIG. 5 through FIG. 8, as shown in the diagrams, the disclosure provides yet another embodiment with technical features as follows: the first short-side resilient arms 231 are in the number of two; the second short-side resilient arms 241 are in the number of two; each of the first short-side resilient arms 231 is U-shaped and has a first short-side bend portion 233; the first short-side bend portions 233 face opposite directions to cause concave portions of the first short-side bend portions 233 to face each other; each of the second short-side resilient arms 241 is U-shaped and has a second short-side bend portion 243; the second short-side bend portions 243 face opposite directions to cause concave portions of the second short-side bend portions 243 to face each other. As shown in FIG. 4 and FIG. 8, the first short-side bend portions 233 protrude from the two long sides of the magnetic assembly butting portion 22 respectively, and the second short-side bend portions 243 protrude from the long sides of the magnetic assembly butting portion 22 respectively. Therefore, the first short-side resilient arms 231 and the second short-side resilient arms 241 are conducive to an increase in length to enhance the resilience of the first short-side resilient arms 231 and the second short-side resilient arms 241 and thereby adjust the resonant frequency of the first short-side resilient arms 231 and the second short-side resilient arms 241, enhancing the effect of vibration damping.

In addition to the first embodiment illustrated by FIG. 1 through FIG. 4 and the second embodiment illustrated by FIG. 5 through FIG. 8, as shown in the diagrams, the disclosure provides yet another embodiment with technical features as follows: the first long-side resilient arms 232 are in the number of two; the second long-side resilient arms 242 are in the number of two; each of the first long-side resilient arms 232 is U-shaped and has a first long-side bend portion 234; the first long-side bend portions 234 face the same direction to cause concave portions of the first long-side bend portions 234 to face outward in the same direction (or inward in the same direction); each of the second long-side resilient arms 242 is U-shaped and has a second long-side bend portion 244; the second long-side bend portions 244 face the same direction to cause concave portions of the second long-side bend portions 244 to face outward in the same direction (or inward in the same direction). As shown in FIG. 4 and FIG. 8, each of the first long-side resilient arms 232 is U-shaped and has a first long-side bend portion 234; a first side and a second side of each of the first long-side bend portions 234 are parallel to the long side of the ring-shaped speaker base butting portion 21 and the long side of the magnetic assembly butting portion 22 respectively and are of length A and length B respectively, with an A-to-B ratio ranging from 1.6:1 to 2.4:1. As shown in the diagrams, each of the second long-side resilient arms 242 is U-shaped and has a second long-side bend portion 244; a first side and a second side of each of the second long-side bend portions 244 are parallel to the long side of the ring-shaped speaker base butting portion 21 and the long side of the magnetic assembly butting portion 22 respectively and are of length A and length B respectively, with an A-to-B ratio ranging from 1.6:1 to 2.4:1. Therefore, the first long-side resilient arms 232 and the second long-side resilient arms 242 can undergo resilience adjustment and thus undergo resonant frequency adjustment to enhance the effect of vibration-damping.

Referring to FIG. 4 and FIG. 8, the disclosure provides yet another embodiment that features a plurality of damping units 40 disposed between the ring-shaped speaker base butting portion 21 and the main magnetic plate 11 or between the fitting portions 211 of the ring-shaped speaker base butting portion 21 and the butting portion 311 of the speaker base 31, with the damping units 40 being symmetrical to each other. The damping units 40 are blocks and are made of silicone, foam, low-viscosity soft glue or any other damping materials. Therefore, the damping units 40 function as buffers between the speaker base 31 and the rectangular magnetic assembly 10 to absorb (consume) the kinetic energy generated from the vibration of the speaker base 31 and prevent the kinetic energy generated from the vibration of the rectangular magnetic assembly 10 from returning, so as to achieve vibration damping and vibration isolation during the operation of the loudspeaker 1 to spare users the discomfort they will otherwise experience for using electronic devices.

The invention is disclosed above by preferred embodiments. However, persons skilled in the art should understand that the embodiments are illustrative of the invention only, but shall not be interpreted as restrictive of the scope of the invention. Please note that all variations and replacements equivalent to the embodiments shall be deemed falling within the scope of the invention. Therefore, the legal protection for the invention shall be defined by the appended claims.

What is claimed is:

1. A vibration-damping rectangular magnetic assembly, comprising:

a rectangular magnetic assembly including a main magnetic plate, a magnetic unit, a vibration-damping structure connecting portion and at least one vibration-damping groove, with the magnetic unit disposed at a top of the main magnetic plate, with the vibration-damping structure connecting portion and the vibration-damping groove disposed at a bottom of the main magnetic plate, with the vibration-damping groove disposed outside the vibration-damping structure connecting portion; and a vibration-damping structure including a ring-shaped speaker base butting portion, a magnetic assembly butting portion, a first resilient connecting module and a second resilient connecting module, with the magnetic assembly butting portion disposed inside the ring-shaped speaker base butting portion, with the first resilient connecting module and the second resilient connecting module connected between two long sides and two short sides of the ring-shaped speaker base butting portion and between two long sides and two short sides of the magnetic assembly butting portion, with the magnetic assembly butting portion connected to the vibration-damping structure connecting portion, with the first resilient connecting module and the second resilient connecting module disposed at the vibration-damping groove.

2. The vibration-damping rectangular magnetic assembly of claim 1, wherein the vibration-damping grooves are in the number of two, the vibration-damping grooves are disposed on two short sides of the main magnetic plate respectively, the first resilient connecting module is disposed at one of the vibration-damping grooves, and the second resilient connecting module is disposed at the other vibration-damping groove.

3. The vibration-damping rectangular magnetic assembly of claim 2, wherein the vibration-damping grooves are U-shaped each, and a portion of each of the vibration-damping grooves extends to the two long sides of the main magnetic plate.

4. The vibration-damping rectangular magnetic assembly of claim 1, wherein the vibration-damping grooves are in the number of one, with the vibration-damping groove being ring-shaped and surrounding the vibration-damping structure connecting portion from outside, wherein the first resilient connecting module and the second resilient connecting module are disposed at the vibration-damping groove, with the first resilient connecting module disposed on a short side of the main magnetic plate and two long sides of the main magnetic plate, with the second resilient connecting module disposed on another short side of the main magnetic plate and the long sides of the main magnetic plate.

5. The vibration-damping rectangular magnetic assembly of claim 1, wherein the ring-shaped speaker base butting portion includes a plurality of fitting portions coupled to a speaker base.

6. The vibration-damping rectangular magnetic assembly of claim 1, wherein the first resilient connecting module includes at least one first short-side resilient arm, and the second resilient connecting module includes at least one second short-side resilient arm, the first and second short-side resilient arms being symmetrical to each other, or the first resilient connecting module includes at least one first long-side resilient arm, and the second resilient connecting module includes at least one second long-side resilient arm, the first and second long-side resilient arms being symmetrical to each other.

7. The vibration-damping rectangular magnetic assembly of claim 6, wherein the first long-side resilient arms are in the number of two, the second long-side resilient arms are in the number of two, the first long-side resilient arms are adjacent to a short side of the magnetic assembly butting portion, and the second long-side resilient arms are adjacent to another short side of the magnetic assembly butting portion.

8. The vibration-damping rectangular magnetic assembly of claim 6, wherein the first long-side resilient arms are in the number of two, the second long-side resilient arms are in the number of two, the first long-side resilient arms and the second long-side resilient arms are adjacent to a middle of the magnetic assembly butting portion.

9. The vibration-damping rectangular magnetic assembly of claim 6, wherein the first short-side resilient arm is connected between a short side of the ring-shaped speaker base butting portion and a short side of the magnetic assembly butting portion, and the second short-side resilient arm is connected between another short side of the ring-shaped speaker base butting portion and another short side of the magnetic assembly butting portion.

10. The vibration-damping rectangular magnetic assembly of claim 6, wherein the first long-side resilient arm is connected between a long side of the ring-shaped frame portion and a long side of the magnetic butting portion, and the second long-side resilient arm is connected between another long side of the ring-shaped frame portion and another long side of the magnetic butting portion.

11. The vibration-damping rectangular magnetic assembly of claim 6, wherein the first short-side resilient arms are in the number of two, the second short-side resilient arms are in the number of two, each of the first short-side resilient arms is U-shaped and has a first short-side bend portion, the first short-side bend portions facing opposite directions, each of the second short-side resilient arms is U-shaped and has a second short-side bend portion, the second short-side bend portions facing opposite directions.

12. The vibration-damping rectangular magnetic assembly of claim 6, wherein the first long-side resilient arms are in the number of two, the second long-side resilient arms are in the number of two, each of the first long-side resilient arms is U-shaped and has a first long-side bend portion, the first long-side bend portions facing the same direction, each of the second long-side resilient arms is U-shaped and has a second long-side bend portion, the second long-side bend portions facing the same direction.

13. The vibration-damping rectangular magnetic assembly of claim 6, wherein each of the first long-side resilient arms is U-shaped and has a first long-side bend portion, a first side and a second side of each of the first long-side bend portions are parallel to a long side of the ring-shaped speaker base butting portion and a long side of the magnetic assembly butting portion respectively and are in a length ratio of from 1.6:1 to 2.4:1, each of the second long-side resilient arms is U-shaped and has a second long-side bend portion, a first side and a second side of each of the second long-side bend portions are parallel to the long side of the ring-shaped speaker base butting portion and the long side of the magnetic assembly butting portion respectively and are in a length ratio of from 1.6:1 to 2.4:1.

14. The vibration-damping rectangular magnetic assembly of claim 1, further comprising a plurality of damping units disposed between the ring-shaped speaker base butting portion and the main magnetic plate or between a fitting portion of the ring-shaped speaker base butting portion and a butting portion of a speaker base, the damping units being symmetrical to each other.

* * * * *